US009537866B2

(12) United States Patent
McDonald et al.

(10) Patent No.: US 9,537,866 B2
(45) Date of Patent: Jan. 3, 2017

(54) METHOD AND APPARATUS TO CONTROL THE USE OF APPLICATIONS BASED ON NETWORK SERVICE

(75) Inventors: Ian James McDonald, Waterloo (CA); Brian Oliver, Waterloo (CA); Alan Panezio, Mississauga (CA); David Lloyd Heit, Waterloo (CA); Nicholas Alfano, Slough (GB); Gregory Scott Henderson, Irving, TX (US); Douglas Gisby, Rolling Meadows, IL (US)

(73) Assignee: BlackBerry Limited, Waterloo, Ontario (CA)

( * ) Notice: Subject to any disclaimer, the term of this patent is extended or adjusted under 35 U.S.C. 154(b) by 671 days.

(21) Appl. No.: 12/446,316

(22) PCT Filed: Oct. 19, 2007

(86) PCT No.: PCT/CA2007/001839
§ 371 (c)(1),
(2), (4) Date: Dec. 7, 2010

(87) PCT Pub. No.: WO2008/046212
PCT Pub. Date: Apr. 24, 2008

(65) Prior Publication Data
US 2011/0065417 A1 Mar. 17, 2011

Related U.S. Application Data

(60) Provisional application No. 60/862,337, filed on Oct. 20, 2006.

(51) Int. Cl.
*G06F 21/00* (2013.01)
*H04L 9/00* (2006.01)
(Continued)

(52) U.S. Cl.
CPC ........... *H04L 63/102* (2013.01); *H04L 63/101* (2013.01); *H04L 67/327* (2013.01); *H04W 12/08* (2013.01); *H04W 88/02* (2013.01)

(58) Field of Classification Search
None
See application file for complete search history.

(56) References Cited

U.S. PATENT DOCUMENTS 7,093,283 B1 * 8/2006 Chen et al. .................. 726/6
7,769,394 B1 * 8/2010 Zhu ........................... 455/456.1
(Continued)

FOREIGN PATENT DOCUMENTS

EP        1531641         5/2005
WO    WO 2005034467 A1 *  4/2005   ........... H04L 29/06

OTHER PUBLICATIONS

PCT International application No. PCT/CA2007/001839, International Search Report, dated Jan. 29, 2008.
(Continued)

*Primary Examiner* — Kent Chang
*Assistant Examiner* — Benjamin Morales Fernandez
(74) *Attorney, Agent, or Firm* — Fish & Richardson P.C.

(57) ABSTRACT

A method and apparatus to control the use of applications on handheld device is based on network service, the method comprising the steps of: receiving a network identifier; correlating the network identifier with application and/or feature limitations stored on the mobile device; and limiting application usage based on the results of such correlating step.

16 Claims, 4 Drawing Sheets

(51) Int. Cl.
*H04L 29/06* (2006.01)
*H04W 12/08* (2009.01)
*H04L 29/08* (2006.01)
*H04W 88/02* (2009.01)

(56) References Cited

U.S. PATENT DOCUMENTS

| | | | |
|---|---|---|---|
| 2004/0123150 A1* | 6/2004 | Wright et al. | 713/201 |
| 2004/0155969 A1* | 8/2004 | Hayashi | 348/207.99 |
| 2004/0198319 A1* | 10/2004 | Whelan et al. | 455/411 |
| 2004/0203362 A1* | 10/2004 | Pattabiraman et al. | 455/41.2 |
| 2004/0205176 A1* | 10/2004 | Ting et al. | 709/223 |
| 2005/0260973 A1* | 11/2005 | van de Groenendaal | 455/411 |
| 2007/0026850 A1* | 2/2007 | Keohane et al. | 455/418 |
| 2007/0198834 A1* | 8/2007 | Ksontini et al. | 713/168 |
| 2008/0305766 A1* | 12/2008 | Falk | 455/410 |

OTHER PUBLICATIONS

EP Application No. 07815990.2, Extended European Search Report, dated Feb. 17, 2010.

Office Action mailed Aug. 6, 2012, in corresponding Canadian patent application No. 2,666,811.

Summons to attend oral proceedings pursuant to Rule 115 (1) EPC mailed Sep. 13, 2012; in European patent application No. 07815990.2.

Decision to Refuse mailed Jan. 15, 2013; in European patent application No. 07815990.2.

Office Action mailed Nov. 7, 2013, in corresponding Canadian patent application No. 2,666,811.

Office Action issued in Canadian Application No. 2,666,811 on Jan. 19, 2015; 3 pages.

Office Action issued in Canadian Application No. 2,666,811 on Jan. 26, 2016; 4 pages.

\* cited by examiner

METHOD AND APPARATUS TO CONTROL THE USE OF APPLICATIONS BASED ON NETWORK SERVICE

FIELD OF THE DISCLOSURE

The present disclosure relates to handheld mobile devices capable of transmitting voice and data and in particular to security and application handling for mobile devices.

BACKGROUND

Mobile devices capable of transmitting voice and data are becoming common in the market place and are sometimes referred to as Smartphones or personal digital assistants (PDAs). Examples include the Research in Motion Blackberry™, Palm Treo™, among others. The capability of transmitting voice over a data connection is called Voice Over Internet Protocol (VoIP) and allows such devices to carry voice traffic over an internet connection, bypassing the traditional circuit switched voice services offered over wide-area wireless networks.

VoIP capability is of great value to enterprises for keeping costs of telephony services low. An example includes a large employer whose factory spans hundreds of acres. The employer can blanket that area with a wireless local area network (WLAN) such as 802.11 (Wireless Fidelity "WiFi") technology and equip its employees with WiFi enabled handsets for VoIP calls over WiFi, thus bypassing the carrier operated wide-area wireless service.

Publicly available applications exist that can be loaded onto a handheld mobile device that offer telephony and multimedia services. Examples include Skype™, MSN™, Yahoo™, and GoogleTalk™. These applications can bypass any corporate control of how the handheld mobile device is used for voice and may potentially be a security risk for the enterprise. Skype™, for example, is peer-to-peer protocol that can pass through corporate firewalls and potentially circumvent corporate IT security measures by using the file transfer feature of Skype™ to transfer corporate proprietary material outside the enterprise.

Peer-to-peer resources sharing protocols such as Skype™ have other characteristics that raise security concerns or may impact corporate policy on use of corporate computing resources for non-corporate purposes. These problems are common to most general purpose telephony applications. While these applications can pose a risk to the corporation, the benefit of low cost telephony service is very attractive and the corporation may accept such risks and depend on the trust it places on its employees to justify the risk. Similar issues exist for multimedia applications.

A further benefit is that when a corporation supplies a handheld device to its employees and allows the employees to use it out of hours and for personal purposes, as long as the use is within reasonable limits, the handheld becomes a significant fringe benefit or a perk for the employee. Thus limiting the use of the handheld only to within the confines of the corporation head office or campus and only for business purposes or only during working hours is seen today as somewhat draconian. A preferable solution would be to ensure that while the employee is connected to the corporation (either by direct connection from within the physical office site or through a virtual private network "VPN" connection) he or she is unable to use any application that may impact the security of the organization. Outside of the corporation and outside of business hours, the handheld may be used for personal and/or work purposes trusting the employee does not misuse the privilege.

BRIEF DESCRIPTION OF THE DRAWINGS

The present disclosure will be better understood with reference to the drawings in which.

DETAILED DESCRIPTION OF THE DRAWINGS

The present disclosure provides a method to control the use of applications on handheld device is based on network service comprising the steps of: receiving a network identifier; correlating the network identifier with application and/or feature limitations stored on the mobile device; and limiting application usage based on the results of such correlating step.

The present disclosure further provides a mobile device adapted to control the use of applications based on network service, for the mobile device comprising: a communications subsystem adapted to communicate with a network and to receive a network identifier; memory to store application limitations for at least one network identifier; a processor adapted to correlating the network identifier with application and/or feature limitations; and a limiting module adapted to limit application usage based on said correlation at said processor.

Figure 1:
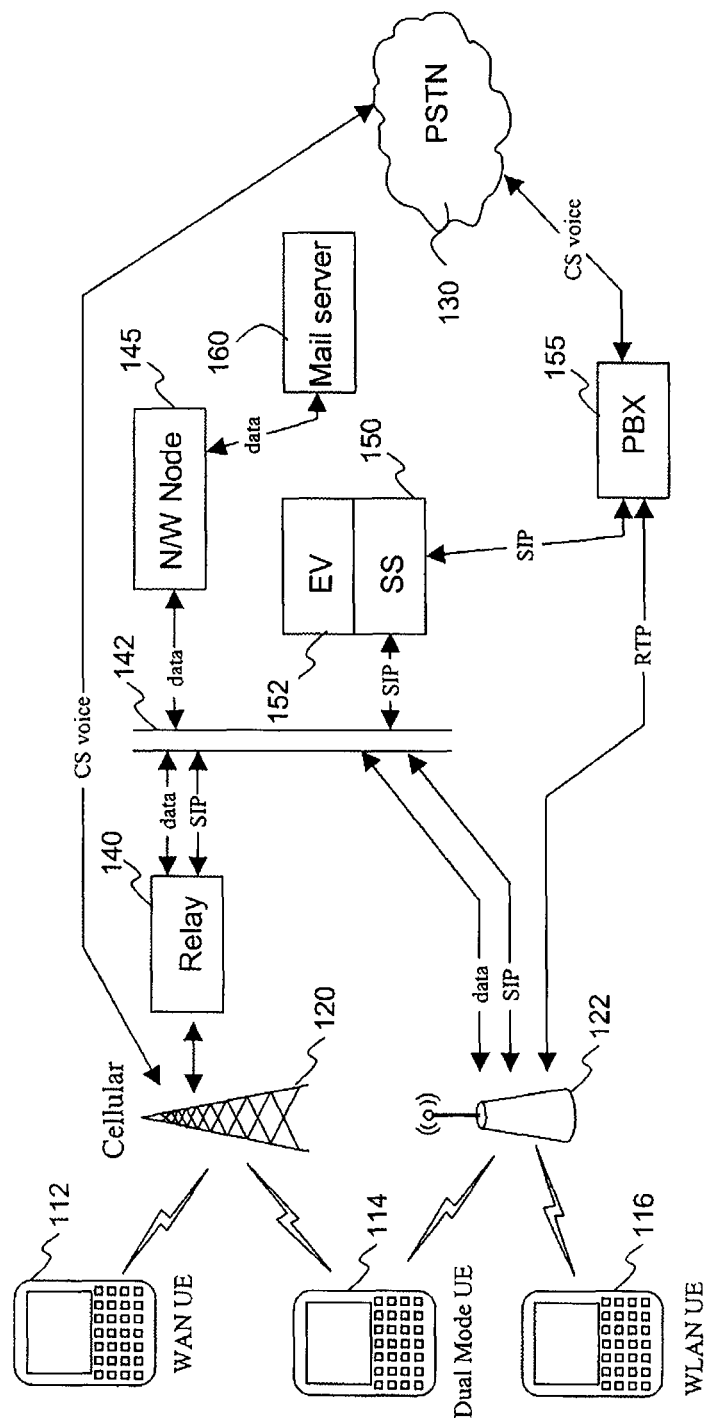
FIG. 1 is a block diagram of an exemplary architecture for a mobile device system.

Reference will now be made to FIG. 1. FIG. 1 illustrates an architectural overview for voice and data. Three mobile devices, 112, 114 and 116 are illustrated.

Mobile device 112 is a single mode wide area network mobile device (WAN) which communicates with a cellular network 120.

Mobile device 116 is a single mode wireless local area network (WLAN) mobile device which communicates with the data access point 122.

Mobile device 114 is a dual mode mobile device which communicates both with the cellular network 120 and the data access point 122.

The present disclosure will use mobile device 114 which is a dual mode mobile device for illustration purposes.

Mobile device 114 may connect through cellular network 120 to provide either voice or data services. As will be appreciated, various cellular networks exist including, but not limited to, Global System for Mobile Communication (GSM), General Packet Radio Service (GPRS), Code Division Multiple Access (CDMA), Universal Mobile Telecommunications System (UMTS), Wideband Code Division Multiple Access (WCDMA), among others. These technologies allow the use of voice, data or both at one time.

A circuit switched call, as seen from FIG. 1, will proceed through a circuit switched voice channel to public switched telephone network 130.

Data proceeds through a relay 140, preferably through a firewall 142 to one of several servers servicing the data call.

As is seen in FIG. 1, data proceeds through the firewall 142 to a network node 145 and potentially out to a Mail Server 160 depending on the nature of the data.

If the call is a transmission of voice over a data connection using VoIP, the data proceeds over session initiation protocol (SIP) to a SIP server 150.

From SIP server 150, the VoIP call proceeds over a private branch exchange (PBX) 155 and then becomes a circuit-switched voice call over Public Switched Telephone Network (PSTN) 130.

Mobile device 114 can further communicate over a data access point for a wireless local network (WLAN). Examples of WLAN technologies include WiFi or Worldwide Interoperability for Microwave Access (WiMax) as underlying technologies of wireless local area networks.

As with the cellular connection, data and VoIP calls can be routed through a firewall 142 to either the network node 145 or to SIP server 150. The VoIP call then would proceed again through PBX 155 to PSTN 130.

Alternatively, the VoIP call can be routed through a real time transport protocol (RTP) directly to the private branch exchange 155 at which point it is converted to a circuit switched call and routed through the public switched telephone network (PSTN) 130.

An Enterprise Voice Server 152 could be included for various functionality including monitoring voice calls, providing call statistics, call costs, policy usage, among others.

The present disclosure includes a method to control the use of telephony applications or other type of applications such as file transfer, instant messaging and text messages, among others, to applications the enterprise deems acceptable to operate while inside the corporate campus and thus behind the corporate firewall. As will be appreciated, the above listed applications are not meant to be limiting, and for example, the employee could be limited from using personal applications loaded on to the mobile device such as music, games, videos while connected to the corporate network. Application, as used herein, could be any software piece, module or executable, or a feature, component or setting thereof designed to fill the needs of a user, and the present disclosure is not meant to be limited to any specific application.

In a preferred embodiment, a mobile device connects to a specific network service such as a corporate WiFi network, and obtains the identifier for that network. For example, in 802.11 technology this is referred to as a Service Set Identifier (SSID). The network identifier can be used to trigger a policy set by the corporation allowing only an approved set of applications to run on the device. As an example, when the employee reports for work in the morning and enters the office, a handheld connects to the corporate WiFi network and any applications that have been loaded onto the handheld by the employee are disabled. When the employee returns home and connects to his home network or any non-corporate network the trigger is reset to allow any application to run on the handheld. In this way, the employee gains the full benefit of a handheld mobile and the employer can ensure during the time the device is on the corporate network only the applications it approves as part of the normal work environment can be used.

Figure 2:
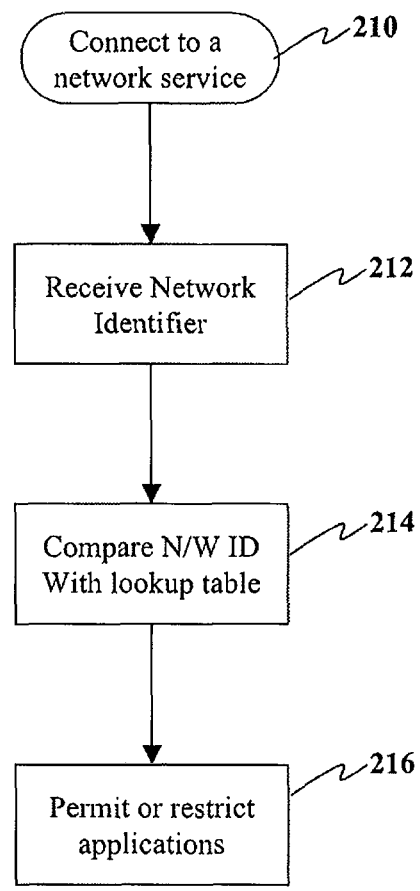
FIG. 2 is a flow chart showing a method of limiting or permitting application usage.

Reference is now made to FIG. 2. FIG. 2 shows a flow diagram of a method within a mobile device for limiting applications. In FIG. 2, a mobile device connects to a specific network service in step 210. As used herein, an application can be any telephony or multimedia application, and the present disclosure is not limited to a particular application type.

The process then proceeds to step 212 in which the network identifier is received by the mobile device. As will be appreciated by those skilled in the art, various network identifiers could be recognized by the mobile device, and the term network identifier is meant to encompass any identifier that can be used to identify a network, whether cellular, WLAN, wired, or others. In step 214 the network identifier received in step 212 is compared with a look up table or database on the mobile device which contains associations between a network identifier and permissible applications. Alternatively, the list could include non-permissible applications or could include both permissible and non-permissible applications. As will be appreciated by those skilled in the art, the look-up table or database could be pre-configured onto the mobile device, could be inserted onto the mobile device by the enterprise or carrier and could be periodically updated an the mobile device. In a further alternative embodiment, the list could be obtained by the mobile device upon connection to the network.

From step 214 the process proceeds to step 216 in which applications loaded on to the mobile device are either permitted to be used or restricted from being used.

Various ways of implementing step 216 would be known to those skilled in the art. These could include, for example, modifying an application launcher to check whether the application is allowed to be run prior to launching the application, among others.

As will be appreciated, the above provides for the placing of management of voice and data services into the enterprise and opens the possibility for the enterprise to fully manage its wireless voice and data usage. The enterprise may also enter into agreements to use the infrastructure from multiple carriers and/or network providers. For example, Internet service providers or other enterprises with wireless services such as Starbucks™ can be among those with which agreements are made. This makes the enterprise act as a consolidator of multiple networks and network access technologies.

In another example, an enterprise operating a public location such as Starbucks™ with its WiFi network may want to limit the types of operations that its customers can perform. In the case of Starbucks™, they may not want a user to use a speaker phone while connected to their WiFi network. Thus, the present disclosure further contemplates the limitation of features as well as applications based on a network identifier for the network that the mobile device is connected to. Other examples include limiting the use of a camera in gyms or in military installations, limiting short range wireless communications, for example in schools, among others.

The present application is not meant to be limited by any specific mobile device. One exemplary mobile device that can be used in association with the present application is described with reference to FIG. 3.

Figure 3:
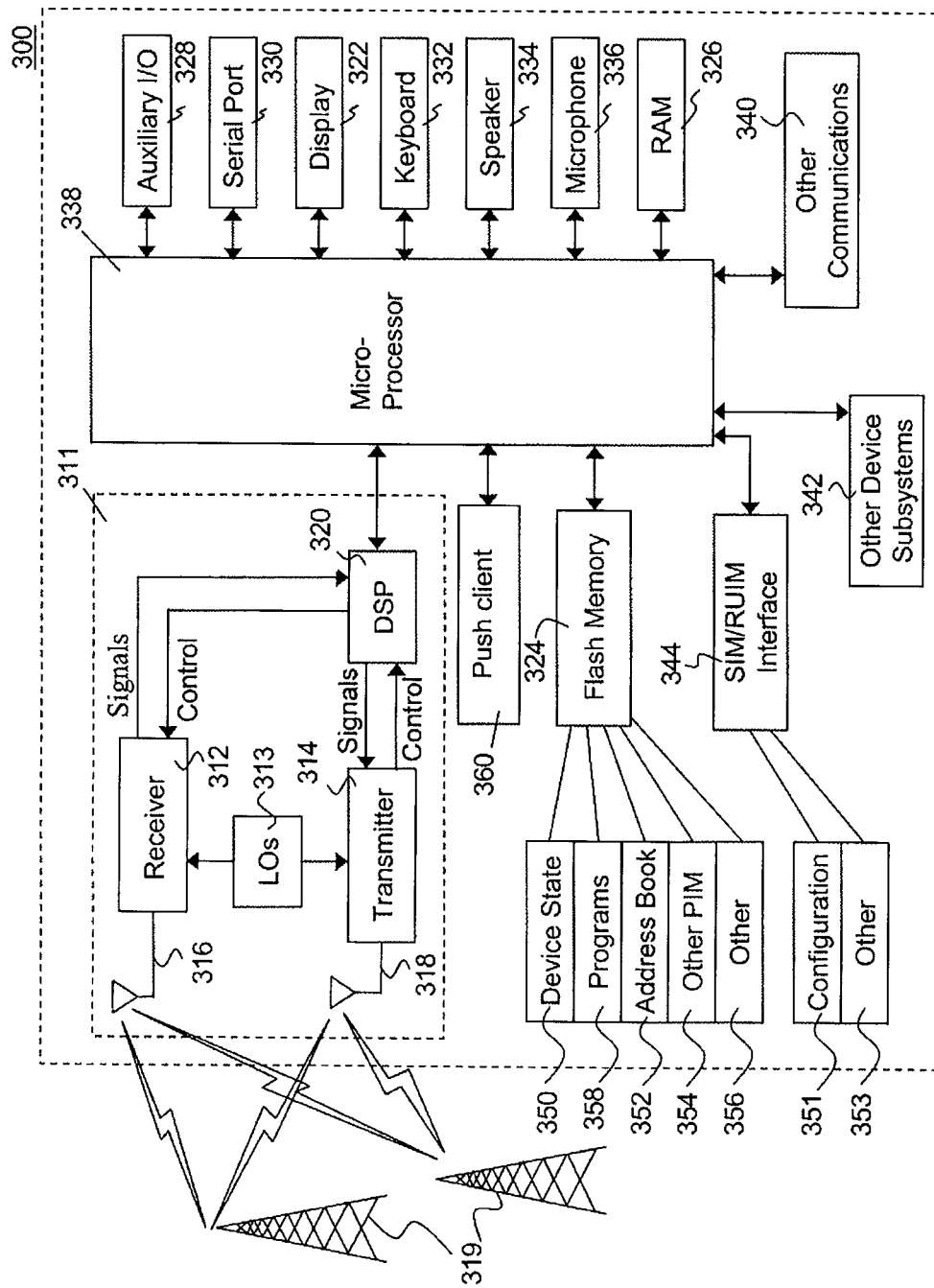
FIG. 3 is a block diagram of an exemplary mobile device that can be used in association with the present method and apparatus.
Figure 4:
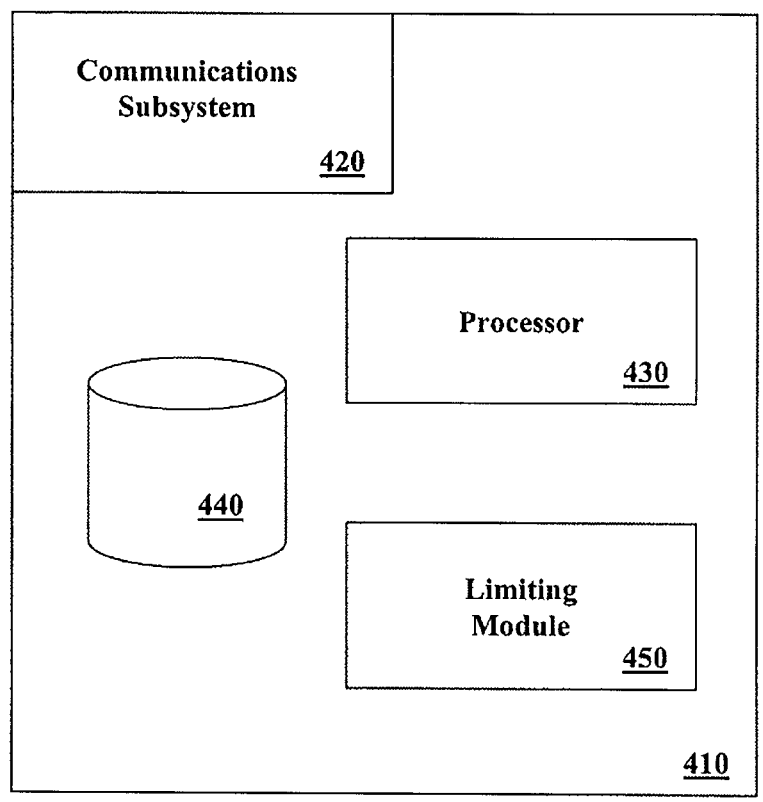
FIG. 4 is a block diagram of simplified mobile device having components for use in the method of the present disclosure.

As will be appreciated, the above can be implemented on any mobile device. Exemplary mobile devices are described below with reference to FIGS. 3 and 4. FIG. 4 shows a block diagram of simplified mobile device having components for use with the method of the present disclosure and FIG. 3 shows an exemplary mobile device. These are not meant to be limiting, but are provided for illustrative purposes.

Referring to FIG. 4, FIG. 4 illustrates a simplified block diagram of an exemplary mobile device 410. Mobile device 410 includes a communications subsystem 420 adapted to communicate with a network. As will be appreciated by those skilled in the art, communications subsystem can be adapted to communicate with one or more types of networks, including but not limited to cellular, WLAN, wired networks that are connected to by short range or plug-in connections such as Bluetooth or USB, among others.

The network that a communications subsystem 420 communicates with includes an identifier. This network identifier is provided to a processor 430, which can then access a look-up table or database in memory 440 and correlate the network identifier with applications.

Based on the results of the correlation, a limiting module 450 can limit an application being launched. Limiting module 450 can be, for example, an application launcher. Thus when a user tries to start an application, limiting module 450 could check whether, based on the network connected to, the application can be launched and thus either block or allow the launching of the application.

Memory 440 can be preconfigured (provisioned) with the look-up table or database, or the look-up table or database could be updated periodically or even whenever the mobile device 410 connects to a network.

FIG. 3 is a block diagram illustrating a mobile device apt to be used with preferred embodiments of the apparatus and method of the present application. Mobile device 300 is preferably a two-way wireless communication device having at least voice and data communication capabilities. Mobile device 300 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile device 300 is enabled for two-way communication, it will incorporate a communication subsystem 311, including both a receiver 312 and a transmitter 314, as well as associated components such as one or more, preferably embedded or internal, antenna elements 316 and 318, local oscillators (LOs) 313, and a processing module such as a digital signal processor (DSP) 320. As will be apparent to those skilled in the field of communications, the particular design of the communication subsystem 311 will be dependent upon the communication network in which the device is intended to operate. Communications subsystem 311 could correspond with communications subsystem 420 of FIG. 4.

Network access requirements will also vary depending upon the type of network 319. In some CDMA networks network access is associated with a subscriber or user of mobile device 300. A CDMA mobile device may require a removable user identity module (RUIM) or a subscriber identity module (SIM) card in order to operate on a CDMA network. The SIM/RUIM interface 344 is normally similar to a card-slot into which a SIM/RUIM card can be inserted and ejected like a diskette or PCMCIA card. The SIM/RUIM card can have approximately 64K of memory and hold many key configuration 351, and other information 353 such as identification, and subscriber related information.

When required network registration or activation procedures have been completed, mobile device 300 may send and receive communication signals over the network 319. As illustrated in FIG. 3, network 319 can consist of multiple base stations communicating with the mobile device. For example, in a hybrid CDMA 1×EVDO system, a CDMA base station and an EVDO base station communicate with the mobile device and the mobile device is connected to both simultaneously. The EVDO and CDMA 1× base stations use different paging slots to communicate with the mobile device.

Signals received by antenna 316 through communication network 319 are input to receiver 312, which may perform such common receiver functions as signal amplification, frequency down conversion, filtering, channel selection and the like, and in the example system shown in FIG. 3, analog to digital (A/D) conversion. A/D conversion of a received signal allows more complex communication functions such as demodulation and decoding to be performed in the DSP 320. In a similar manner, signals to be transmitted are processed, including modulation and encoding for example, by DSP 320 and input to transmitter 314 for digital to analog conversion, frequency up conversion, filtering, amplification and transmission over the communication network 319 via antenna 318. DSP 320 not only processes communication signals, but also provides for receiver and transmitter control. For example, the gains applied to communication signals in receiver 312 and transmitter 314 may be adaptively controlled through automatic gain control algorithms implemented in DSP 320.

Mobile device 300 preferably includes a microprocessor 338 which controls the overall operation of the device. Microprocessor 338 could correspond to processor 430 from FIG. 4. Communication functions, including at least data and voice communications, are performed through communication subsystem 311. Microprocessor 338 also interacts with further device subsystems such as the display 322, flash memory 324, random access memory (RAM) 326, auxiliary input/output (I/O) subsystems 328, serial port 330, one or more keyboards or keypads 332, speaker 334, microphone 336, other communication subsystem 340 such as a short-range communications subsystem and any other device subsystems generally designated as 342. Serial port 330 could include a USB port or other port known to those in the art.

Some of the subsystems shown in FIG. 3 perform communication-related functions, whereas other subsystems may provide "resident" or on-device functions. Notably, some subsystems, such as keyboard 332 and display 322, for example, may be used for both communication-related functions, such as entering a text message for transmission over a communication network, and device-resident functions such as a calculator or task list.

Operating system software used by the microprocessor 338 is preferably stored in a persistent store such as flash memory 324, which may instead be a read-only memory (ROM) or similar storage element (not shown). Those skilled in the art will appreciate that the operating system, specific device applications, or parts thereof, may be temporarily loaded into a volatile memory such as RAM 326. Received communication signals may also be stored in RAM 326. Memory 440 from FIG. 4 could correspond with any of RAM 326 or flash memory 324.

As shown, flash memory 324 can be segregated into different areas for both computer programs 358 and program data storage 350, 352, 354 and 356. These different storage types indicate that each program can allocate a portion of flash memory 324 for their own data storage requirements. Microprocessor 338, in addition to its operating system functions, preferably enables execution of software applications on the mobile device. A predetermined set of applications that control basic operations, including at least data and voice communication applications for example, will normally be installed on mobile device 300 during manufacturing. Other applications could be installed subsequently or dynamically. One such application could be a limiting module such as an application launcher.

A preferred software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application would preferably have the ability to send and receive data items, via the wireless network 319. In a preferred embodiment, the PIM data items are seamlessly integrated, synchronized and updated, via the wireless network 319, with the mobile device user's corresponding data items stored or associated with a host computer system. Further applications may also be loaded onto the mobile device 300 through the network 319, an auxiliary I/O subsystem 328, serial port 330, short-range communications subsystem 340 or any other suitable subsystem 342, and installed by a user in the RAM 326 or preferably a non-volatile store (not shown) for execution by the microprocessor 338. Such flexibility in application installation increases the functionality of the device and may provide enhanced on-device functions, communication-related functions, or both. For example, secure communication applications may enable electronic commerce functions and other such financial transactions to be performed using the mobile device 300.

In a data communication mode, a received signal such as a text message or web page download will be processed by the communication subsystem 311 and input to the microprocessor 338, which preferably further processes the received signal for element attributes for output to the display 322, or alternatively to an auxiliary I/O device 328. A push client 360 could also process the input.

A user of mobile device 300 may also compose data items such as email messages for example, using the keyboard 332, which is preferably a complete alphanumeric keyboard or telephone-type keypad, in conjunction with the display 322 and possibly an auxiliary I/O device 328. Such composed items may then be transmitted over a communication network through the communication subsystem 311.

For voice communications, overall operation of mobile device 300 is similar, except that received signals would preferably be output to a speaker 334 and signals for transmission would be generated by a microphone 336. Alternative voice or audio I/O subsystems, such as a voice message recording subsystem, may also be implemented on mobile device 300. Although voice or audio signal output is preferably accomplished primarily through the speaker 334, display 322 may also be used to provide an indication of the identity of a calling party, the duration of a voice call, or other voice call related information for example.

Serial port 330 in FIG. 3 would normally be implemented in a personal digital assistant (PDA)-type mobile device for which synchronization with a user's desktop computer (not shown) may be desirable, but is an optional device component. Such a port 330 would enable a user to set preferences through an external device or software application and would extend the capabilities of mobile device 300 by providing for information or software downloads to mobile device 300 other than through a wireless communication network. The alternate download path may for example be used to load an encryption key onto the device through a direct and thus reliable and trusted connection to thereby enable secure device communication. As will be appreciated by those skilled in the art, serial port 330 can further be used to connect the mobile device to a computer to act as a modem.

Other communications subsystems 340, such as a short-range communications subsystem, is a further optional component which may provide for communication between mobile device 300 and different systems or devices, which need not necessarily be similar devices. For example, the subsystem 340 may include an infrared device and associated circuits and components or a Bluetooth™ communication module to provide for communication with similarly enabled systems and devices. Subsystem 340 may also be used for WiFi communications.

As will be appreciated by those skilled in the art, communications subsystem 420 from FIG. 4 could equate to communications subsystem 311, other communications 340, serial port 330, and/or auxiliary I/O 328, among others.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

We claim:

1. A method for controlling applications executable on a mobile device, comprising the steps of:
    establishing a connection to a network service having a network identifier;
    determining by the mobile device, using only the network identifier, from a memory that directly correlates network identifiers to applications, whether the network identifier is that of a restricted network in which the device allows execution of only an approved subset of applications from a plurality of applications stored on said device;
    enabling for execution, while connected to the restricted network, only the approved subset of applications from all the applications on said mobile device;
    triggering based on the network identifier a determination of feature limitations, stored on the mobile device, to be applied to the approved subset of applications;
    applying, upon launching an application, the determined feature limitations to the approved subset of applications while connected to the restricted network, the feature limitations including disallowed features that allow selected applications in said approved subset of applications to execute while disabling the disallowed features of the executing selected applications; and
    enabling all of said plurality of applications when it is determined that mobile device is unconnected to the restricted network.

2. The method of claim 1, wherein said network is a wireless local area network.

3. The method of claim 1, wherein the network is a cellular network.

4. The method of claim 1, wherein said feature limitations are stored in a database, said database is preconfigured on the mobile device.

5. The method of claim 1, wherein said feature limitations are stored in a database, said database is loaded onto said mobile device upon connection to the network.

6. The method of claim 1, wherein the said feature limitations are applied by an application launcher.

7. The method of claim 1, wherein said feature limitations are stored in a database, said database includes a correlation between the network identifier and allowed applications.

8. The method of claim 1, wherein said feature limitations are stored in a database, said database includes a correlation between the network identifier and restricted applications.

9. The method of claim 1, wherein said feature limitations are stored in a database, said database includes a correlation between the network identifier and both allowed applications and restricted applications.

10. A mobile device configured to control applications executable on the mobile device based on network service, comprising:
    a communications subsystem configured to establish a connection to a network;
    memory to store application or feature limitations;
    a processor configured to:
    determine that the established connection is to a specified network service the network service having a network identifier;
    determine using only the network identifier, from a memory that directly correlates network identifiers to applications, whether the network identifier is that of a restricted network in which the device allows execution of only an approved subset of applications from a plurality of applications stored on said device;
    enable for execution, while connected to the restricted network, only the approved subset of applications from all the applications on said mobile device;
    trigger based on the network identifier a determination of feature limitations, stored on the mobile device, to be applied to the approved subset of applications;
    apply, upon launching an application, the determined feature limitations to the approved subset of applications while connected to the restricted network, the feature limitations including disallowed features that allow selected applications in said approved subset of applications to execute while disabling the disallowed features of the executing selected applications; and
    enable all of said plurality of applications when it is determined that mobile device is unconnected to the restricted network.

11. The mobile device of claim 10, wherein said network is a wireless local area network.

12. The mobile device of claim 10, wherein the network is a cellular network.

13. The mobile device of claim 10, wherein said application feature limitations are stored in a look up table in said memory.

14. The mobile device of claim 13, wherein said look up table is preconfigured on the mobile device.

15. The mobile device of claim 13, wherein said look up table is loaded onto said mobile device upon connection to the network.

16. The mobile device of claim 10, wherein said feature limitations are applied by an application launcher.

* * * * *